Figure 3:
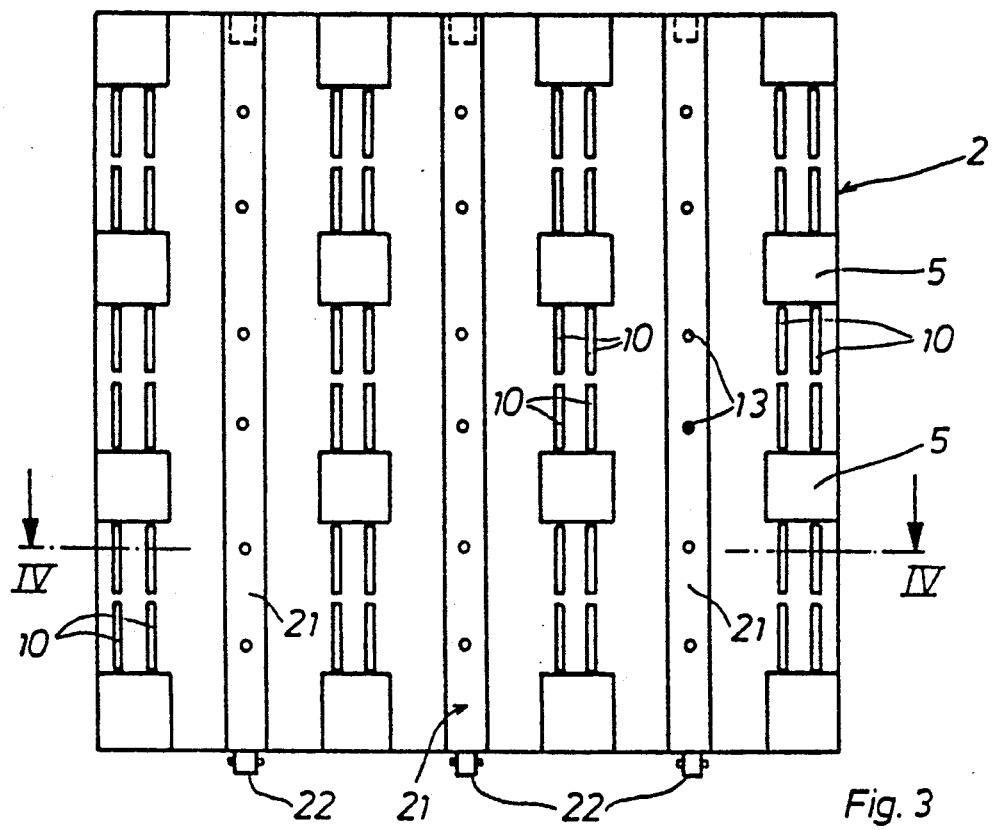

United States Patent [19]

Stützle

[11] Patent Number: 5,294,235
[45] Date of Patent: Mar. 15, 1994

[54] DEVICE FOR THE SUPPLY, DISTRIBUTION AND MOISTENING OF GAS IN A GAS-CLEANING OR DECOMPOSITION INSTALLATION

[76] Inventor: Hugo Stützle, Alte Strasse 26, W 7900 Ulm/Donau, Fed. Rep. of Germany

[21] Appl. No.: 64,100
[22] PCT Filed: Sep. 21, 1992
[86] PCT No.: PCT/DE92/00809
   § 371 Date: May 17, 1993
   § 102(e) Date: May 17, 1993
[87] PCT Pub. No.: WO93/05863
   PCT Pub. Date: Apr. 1, 1993

[30] Foreign Application Priority Data

Sep. 25, 1991 [DE] Fed. Rep. of Germany ....... 4131893

[51] Int. Cl.[5] .................................................. F26B 17/00
[52] U.S. Cl. .................................. 55/228; 55/229; 261/117; 34/57 A; 34/72; 34/225
[58] Field of Search ............... 34/72, 57 A, 225; 261/117; 55/229, 228

[56] References Cited

U.S. PATENT DOCUMENTS

| | | | |
|---|---|---|---|
| 1,853,424 | 4/1932 | Harris | 34/72 |
| 2,278,432 | 4/1942 | Dunn | 261/117 |
| 2,702,742 | 2/1955 | Hillard, Jr. | 34/57 A |
| 2,913,116 | 11/1959 | Cover | 261/117 |
| 3,349,502 | 10/1967 | Kiefer | 34/225 |
| 4,067,707 | 1/1978 | Atsukawa et al. | 261/117 |
| 4,143,588 | 3/1979 | Exler | 34/225 |
| 4,440,698 | 4/1984 | Bloomer | 261/117 |
| 4,521,976 | 6/1985 | Stewart et al. | 34/57 A |

FOREIGN PATENT DOCUMENTS 2705732 8/1978 Fed. Rep. of Germany.
3634377 4/1987 Fed. Rep. of Germany.

*Primary Examiner*—Tom Miles
*Attorney, Agent, or Firm*—Herbert Dubno

[57] ABSTRACT

The device has a base plate (3) equipped to receive bulk material, composed by one or more gas distribution plates, which has gas outlet openings (10) distributed over the plate surface, further it has gas distribution chambers (6) provided on the bottom side of the gas distribution plates and in contact with the gas outlet openings (10), which are connected to a gas supply line (9) and water-fed spray nozzles (spray cones 12) for moistening the gas, which are distributed over the plate surface underneath the gas distribution plates (6) and abut directly in the gas distribution chambers (6). As a result the gas is moistened only immediately before it flows into the gas outlet openings.

11 Claims, 2 Drawing Sheets

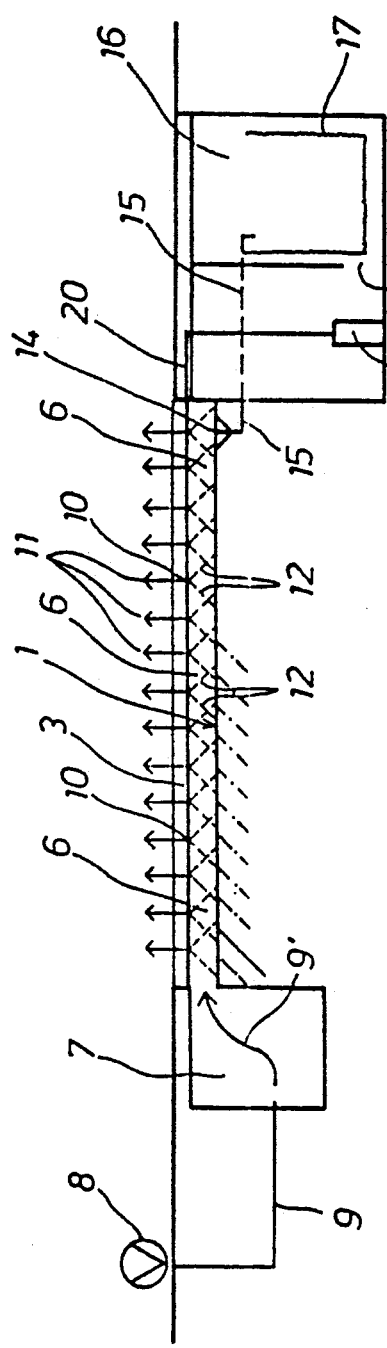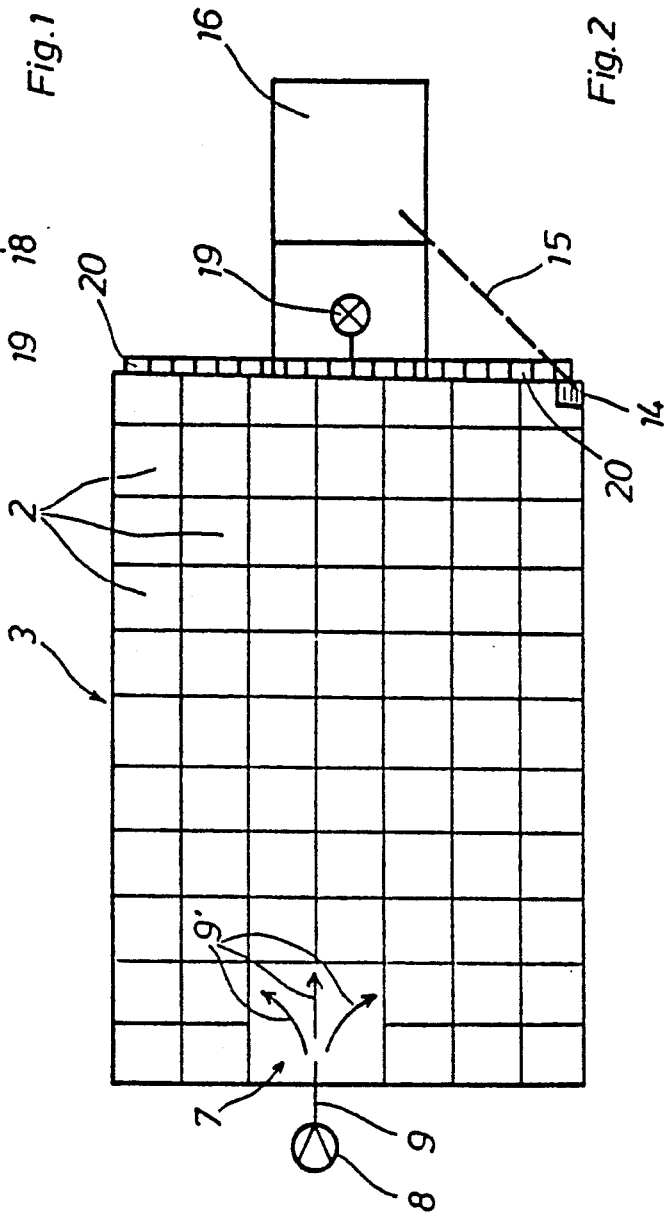

DEVICE FOR THE SUPPLY, DISTRIBUTION AND MOISTENING OF GAS IN A GAS-CLEANING OR DECOMPOSITION INSTALLATION

This application is a 371 of PCT/DE92/00809, filed Sep. 21, 1992.

The invention relates to a device for the supply, distribution and moistening of gas in a gas-cleaning or decomposition plant, with at least one gas distribution plate provided for receiving the bulk material having gas outlet openings distributed over the plate surface, further with one or more gas distribution chambers provided on the bottom side of the gas distribution plate and in contact with the gas outlet openings, which are connected to one or more gas supply lines, and with spray nozzles to which water can be fed for moistening the gas.

In a device of this kind known from DE 36 34 377 C2, the gas distribution chambers consist of gas channels formed in the gas distribution plates and connecting the gas outlet openings in series, and which are connected over a common collection channel to the supply line for the gas. Between the collection channel and the supply line an inlet chamber is provided, which contains a spraying device for gas moistening with a water tank, spray nozzle arranged thereabove and a pump. The supply line abuts in the inlet chamber and the collection channel is connected with an outlet of the inlet chamber. The gas is moistened in the inlet chamber by the spraying device. The gas so enriched with moisture traverses the collection channel and the gas lines, before it reaches the bulk material layered on the gas distribution plate through the gas outlet openings. As a rule, such installations have relatively large dimensions with regard to the gas distribution plates, so that the channels for gas collection and distribution extend over correspondingly long stretches, between 10 and 100 m in length. While travelling these long stretches the gas loses again a considerable part of the moisture supplied in the inlet chamber, with the result that the gas flowing through the bulk material is already too dry and that the processes supposed to take place in the bulk material can no longer be carried out in optimal conditions because of insufficient humidity.

It is the object of the invention to develop a device of the aforementioned kind, so that the humidity imparted to the gas can act fully on the bulk material.

According to the invention this problem is solved due to the fact that the spray nozzles are arranged under the gas distribution plate, are distributed over the entire plate surface and abut directly in the gas distribution chambers.

The advantage achieved by the invention consists essentially in the fact that the water evenly distributed over the surface of the gas distribution plate is sprayed directly into the gas distribution chambers and therefore the gas moistening takes place immediately under the gas distribution plate in front of the gas passage openings. This way the moistened gas reaches the bulk material over the shortest possible path, namely only by passing through the gas outlet openings and this way can not lose noticeable amounts of moisture, so that the water introduced into the gas can fully reach the bulk material and act upon it. A further very substantial advantage consists in fact that the water introduced through the spray nozzles into the gas distribution chambers, but which is not absorbed in the gas, can exert a permanent cleaning action in the gas distribution chambers and can rinse out the bulk material which reached the gas distribution chambers coming from above through the gas outlet openings.

A preferred embodiment of the invention is characterized in that the gas distribution plate is supported with a clearance on a substrate and that the gas distribution chambers are formed between the substrate and the gas distribution plate, whereby the substrate is waterproof and inclined in the direction of at least one water drainage opening which collects the water running off the substrate. In the gas distribution chambers between the gas distribution plate and the substrate, the gas can distribute itself evenly in any direction and flows towards the gas outlet openings. At the same time there is sufficient space for large-scale water diffusion and thereby for particularly effective gas moistening. Dispersed water which was not absorbed by the gas, as well as water infiltrations from the bulk material and the bulk material itself as far as it has fallen down into the gas distribution chambers through the gas outlet openings can run off on the waterproof substrate into the water dr image opening, collected, treated and the water can then be again used for gas moistening. An embodiment particularly advantageous to this effect is characterized in that a water collection well with a filter installation for fine particles and a pump succeeding this filter installation are provided, whereby the drainage opening is connected on the inlet side of the filter arrangement and the spray nozzles can be actuated by filtered water through the pump.

The spray nozzles are arranged preferably on the underside of the gas distribution plate with their nozzle openings directed vertically and/or downwardly inclined, whereby it is advisable to select the arrangement so that in the gas distribution chambers the spray cones of adjacent spray nozzles intersect each other, and as a result the generated water mist fills the gas distribution chambers entirely, and this way the gas in counter flow can reach the gas outlet openings only by traversing the water mist.

In detail supply lines for water under pressure are suitably provided at the underside of the gas distribution plate for feeding the nozzles. In a particularly simple and thus advantageous embodiment the spray nozzles are formed by nozzle openings made directly in the supply line for water under pressure. In any case it is advisable that the supply lines for water under pressure run in bunches, parallel to each other, and be closed at one end of the line and connected with the other line end with a water distribution line which is for instance fed by the mentioned pump. Besides, water lines for water under pressure can be designed as hoses or pipes held on the underside of the gas distribution plate or as channels running in the gas distribution plate. The best solution is to arrange the gas outlet openings in parallel rows having between each two of them a row of spray nozzles Further the invention is closer described with the aid of an embodiment example represented in the drawing; it shows:

FIG. 1 a vertical longitudinal section through a device for the supply, distribution and moistening of gas in a composting installation, in schematic representation, FIG. 2 a top view of the installation according to FIG. 1

Figure 4:
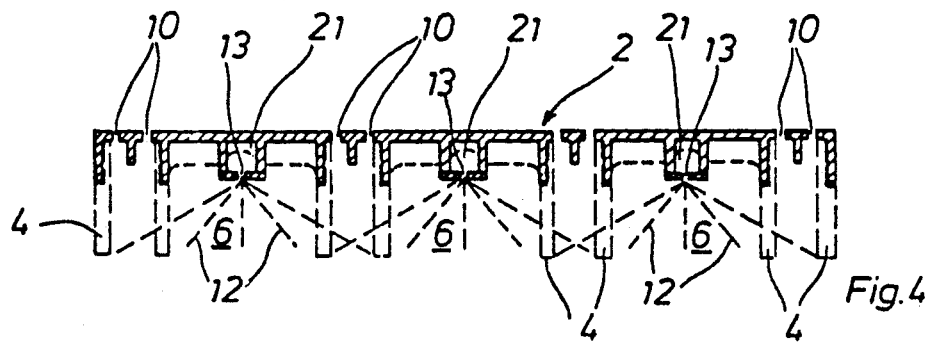

FIG. 3 the gas distribution plate of the installation according to FIGS. 1 and 2 in a bottom view, and FIG. 4 a gas distribution plate according to FIG. 3 in a cross section along the section lines IV—IV.

In FIG. 1 a base plate 3 composed by a multitude of gas distribution plates 2 as individually indicated in FIG. 2, which has a bearing capability suitable for processing and receiving bulk material, such as compost or the like, is arranged over a substrate consisting for instance of a levelled, compacted soil 1 provided with a water proof coating. Therefor the individual gas distribution plates 2 are supported on the substrate 1 by a support structure 4 shown only in broken lines in FIG. 4, so that between the gas distribution plate 2 and the substrate 1 a clearance remains. This support structure can be built in a variety of ways. In FIG. 4 it is assumed that it consists basically of support legs arranged at a distance from each other and which are inserted in fitting recesses 5 at the gas distribution plate 2 and are generally built so that they mutually fasten the individual gas distribution plates 2 as components of the base plate 3. Besides, basically the support structure also has to make sure that a free gas distribution chamber 6 is created between the substrate 1 and the base plate 3, wherein a gas, particularly air, coming for instance from the air distribution compartment 7 and fed to the gas distribution chamber 6 in the direction of the arrow 9, can spread and distribute itself evenly over the entire surface of the gas distribution plates 2. The gas supply is accomplished by gas blower 8 through a supply line 9. In the gas distribution plates 2 there are gas outlet openings 10 distributed over the plate surface, which are connected in a downward direction with the gas distribution chamber 6 and through which the gas from the gas distribution chamber 6 can flow in the direction of arrows 11 into the bulk material heaped on the base plate 3. Underneath the gas distribution plates 2 spray nozzles are provided, only their spray cones 12 being indicated in broken lines, and which are also evenly distributed over the plate surface and abut directly in the gas distribution chamber 6. The waterproof substrate 1 is slightly inclined in the direction of a water drainage opening 14, so that the water of the spray cones 12 not absorbed by the gas in the gas distribution chamber 6, as well as the infiltration water coming from the bulk material and reaching the gas distribution chamber 6 through the gas outlet openings 10, can run off on the substrate 1 towards the water drainage opening 14. Over the line 15, the water drainage opening 14 is in contact with the inlet side of a water collecting well 16, where a filter device 17 for fine particles is provided, after whose outlet side 18 a pump 19 is connected, which directs the water filtered and treated in the filter device 17 to a water distribution line 20, from where the spray nozzles arranged in the gas distribution chamber 6 are supplied with water. Besides, the water distribution line 20 or the water collecting well 16 can also be connected to a water supply main, not shown in the drawing, in order to compensate for the water lost in the cycle. The spray nozzles are arranged on the underside of the gas distribution plates 2 with their nozzle openings 13 directed vertically and/or downwardly inclined, so that the spray water cones 12 of adjacent spray nozzles intersect each other in the space of the gas distribution chamber 6, as can be seen from FIGS. 1 and 4 from the spray cones 12 shown in broken lines. In detail, pressure water lines 21, running on the underside of the gas distribution plate 2, are provided for feeding the spray nozzles from the water distribution line 20. Thereby the spray nozzles consist of nozzle openings 13 made directly in the wall of the pressure water lines 21. These pressure water lines 21 run parallel to each other in bunches and are closed at the one line end, in FIG. 1 towards the air distribution compartment 7 and with the other line end are connected to the water distribution line 20. The lines 21 for the supply of water under pressure can be hoses or pipes which extend over the entire length of the base plate 3 composed by individual gas distribution plates 2 and are fastened to the underside of the gas distribution plates 2, for instance with suitable clamps. However the drawing shows an embodiment wherein the pressure water supply lines 21 are designed as channels running directly inside the gas distribution plate 2. If several of the gas distribution plates are fitted one next to the other, the channels are connected by plug-in connections 22 as indicated in FIG. 3. FIG. 3 also shows that the gas outlet openings 10 are arranged in parallel rows and between them the spray nozzles with the nozzles openings 13 are arranged in a separate row.

I claim:

1. Device for the supply, distribution and moistening of gas in a gas-cleaning or decomposition installation, with at least one gas distribution plate (2) equipped to receive bulk material, which has gas outlet openings (10) distributed over the plate surface, further with one or more gas distribution chambers (6) provided on the bottom side of the gas distribution plate (2) in contact with the gas outlet openings (10), connected to one or more gas supply lines (9) and with spray nozzles to which water can be fed for moistening the gas, characterized in that the spray nozzles are distributed over the plate surface underneath the gas distribution plate (6) (sic) and abut directly into the gas distribution chambers (6).

2. Device according to claim 1, characterized in that the gas distribution plate (2) is supported on a substrate (1) with a clearance and that the gas distribution chambers (6) are formed between the substrate (1) and the gas distribution plate (2), whereby the substrate (1) is waterproof and inclined towards the water drainage opening (14) receiving the water running off the substrate.

3. Device according to claim 2, characterized in that a water collection well (16) with a filtering device (17) for fine particles succeeded by a pump (19) are provided, whereby the water drainage opening (14) is connected with the water collection well (16) on the incoming side of the filtering device (17) and the spray nozzles are supplied with filtered water by the pump (19).

4. Device according to claim 1, characterized in that the spray nozzles are arranged at the underside of the gas distribution plate (2) with vertically directed or downwardly inclined nozzle openings (13).

5. Device according to claim 4, characterized in that on the underside of the gas distribution plate (2) run the pressure water lines (21) feeding the spray nozzles.

6. Device according to claim 5, characterized in that the spray nozzles are formed by nozzle openings (13) made directly in the walling of the pressure water lines (21).

7. Device according to claim 5, characterized in that the pressure water lines (21) run in bunches parallel to each other and are closed at one line end, while the other line end is connected to a water distribution main (20).

8. Device according to claim 5, characterized in that the water pressure lines (21) are hoses or pipes and are fastened to the bottom side of the gas distribution plate (2).

9. Device according to claim 5, characterized in that the water distribution lines (21) are designed as channels running directly through the gas distribution plate (2).

10. Device according to claim 1, characterized in that the gas outlet openings (10) are arranged in parallel rows with one row of spray nozzles in between.

11. Device according to claim 1, characterized in that the spray water cones (12) of adjacent spray nozzles intersect each other in the gas distribution chambers (6).

* * * * *